April 14, 1959 C. W. KNODEL, JR 2,881,831
VEHICLE WINDOW SCREEN
Filed May 25, 1956 2 Sheets-Sheet 1
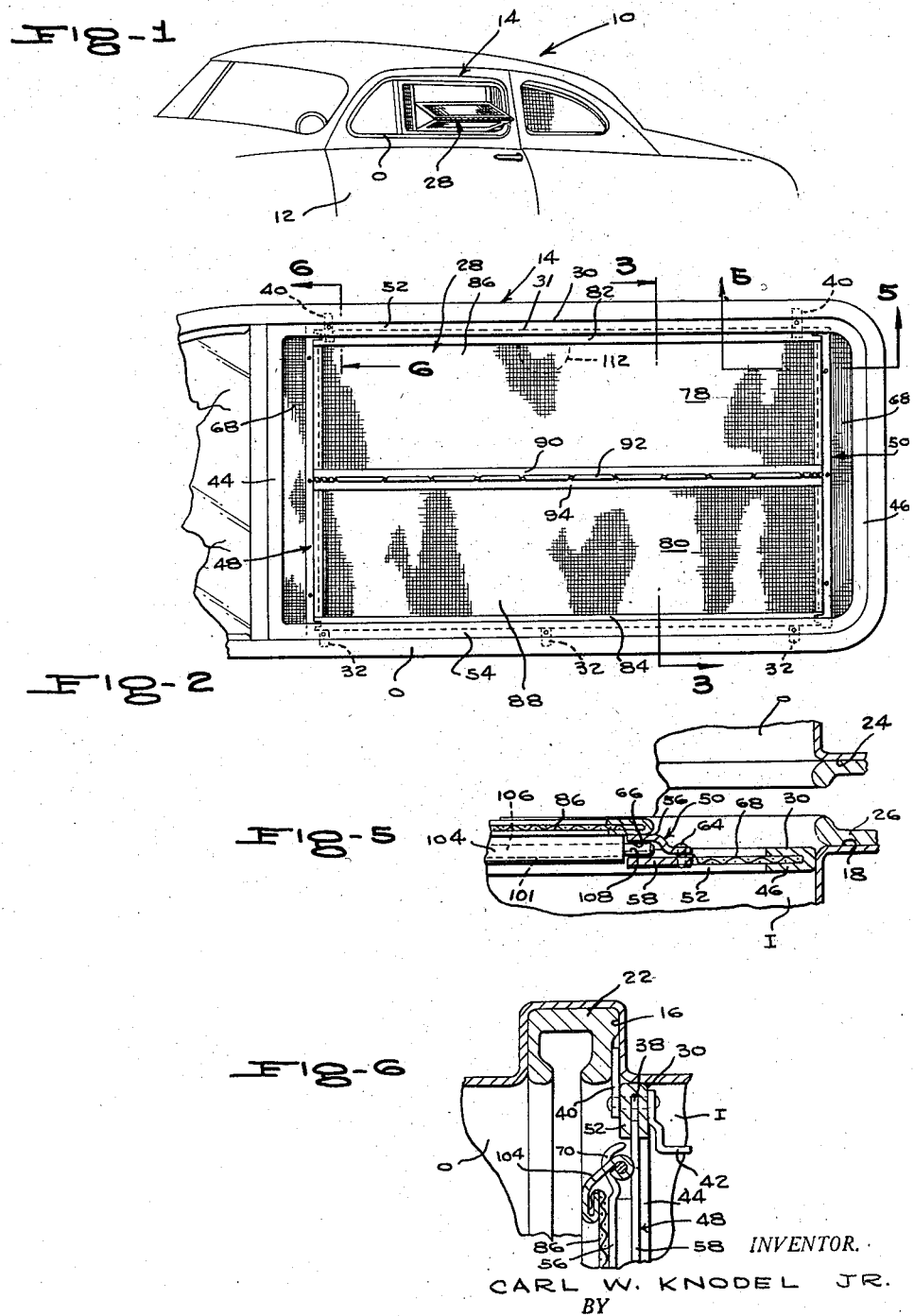
INVENTOR.
CARL W. KNODEL JR.
BY
McMorrow, Berman & Davidson
ATTORNEYS

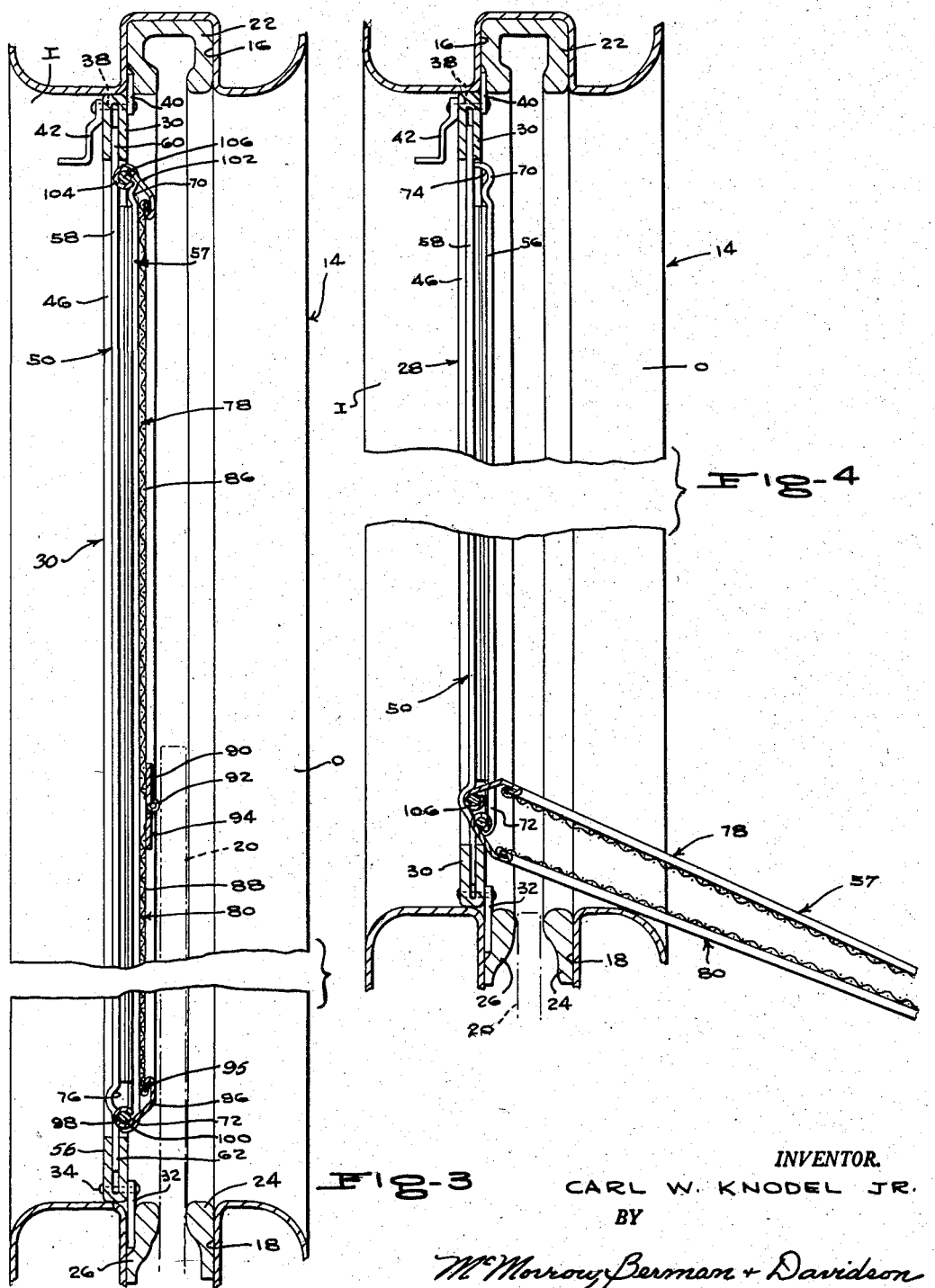

United States Patent Office 2,881,831
Patented Apr. 14, 1959

2,881,831

VEHICLE WINDOW SCREEN

Carl William Knodel, Jr., Mobile, Ala.

Application May 25, 1956, Serial No. 587,286

3 Claims. (Cl. 160—105)

This invention relates to an improved screen for installation in vehicle window frames, the screen being composed of two horizontally hinged sections which are arranged to be hinged relative to each other to open positions.

The primary object of the invention is to provide a more practical and efficient screen of this kind which is easily installed in and removed from a vehicle window frame and which does not interfere with opening and closing of the window glass, the screen having a frame in which upper and lower horizontally hinged screen sections are hinged, the upper section being also slidably guided in the frame to be moved from a lowered hinged relation over the lower section to an elevated closed position wherein the screen sections are in vertical coplanar relation, the frame having releasable retaining means for holding the sections in open and closed positions.

Another object of the invention is to provide a screen of the character indicated above which is simple in construction, and is composed of a small number of simple and easily assembled parts.

A further object of the invention is to provide a screen of the character set forth which can be made in attractive, rugged, and serviceable forms at relatively low cost, is easily operated, and is highly satisfactory and acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a fragmentary perspective view of an automotive vehicle showing a screen of the present invention installed in a front window at the driver's side of the vehicle, and in open position;

Figure 2 is an enlarged fragmentary outboard side elevational view of Figure 1, showing the screen in closed position;

Figure 3 is an enlarged contracted vertical transverse sectional view taken substantially on line 3—3 of Figure 2;

Figure 4 is a sectional view similar to Figure 3, showing the sections of the screen folded in open position;

Figure 5 is an enlarged fragmentary horizontal sectional view taken substantially on line 5—5 of Figure 2; and Figure 6 is an enlarged vertical transverse sectional view taken substantially on line 6—6 of Figure 2.

Referring to the drawings in detail, indicated generally at 10 is an automotive vehicle body which has at the driver's side thereof a door 12 having therein a rectangular window frame, indicated generally at 14, which has therein a channel 16, see Figure 3, extending around its top and sides, and a slot 18 on its bottom in which a window glass 20 is vertically adjustable. Secured in the channel 16 is a channel strip 22 for sealingly receiving the upper and side edges of the window glass 20, and the slot 18 has on opposite sides thereof resilient glass-engaging strips 24 and 26. The foregoing structure is conventional. For the purposes of orientation, the outboard side of the window frame 14 is indicated at O, and the inboard side thereof is indicated at I.

The illustrated screen, indicated generally at 28, comprises a rigid rectangular frame 30 of U-shaped cross section, the screen frame 30 being proportioned to fit the opening of the window frame 14.

For mounting the screen frame 30 in the window frame opening at the inboard side of the window frame 14, the lower screen frame member 54 has pivoted on its outboard side, as indicated at 34, spaced lugs 32, see Figures 2 and 3, which are forced between the resilient strip 26, at the inboard side of the slot 18 of the window frame 14 and the adjacent side of the slot, with the lower screen frame member 54 resting upon the lower member of the window frame 14. At longitudinally spaced points along the upper member 52 of the screen frame 30, headed pins 38 traverse the portion 52, in which are fixed lugs 40 at the outboard side of the frame 30 and hand levers 42 at the inboard side of the frame 30, the levers 42 being operable to force the lugs 40 upwardly between the channel strip 22 and the inboard side of the window frame channel 16.

Spaced longitudinally inwardly from the vertical end members 44 and 46 of the frame 30 and secured at their upper and lower ends to the screen frame upper and lower members 52 and 54 are vertical tracks, indicated generally at 48 and 50.

The tracks 48 and 50 are identical and reversed and substantially channel shaped, and open toward each other. As clearly seen in Figures 3 and 5, the track 50 comprises inner and outer vertical strips 56 and 58, the outer strip 58 having upper and lower end portions 60 and 62 suitably secured in the upper and lower screen frame members 52 and 54, respectively. As seen in Figure 5, the inner strip 56 is spaced inwardly from the outer strip 58 and has an offset portion secured to the outer strip 58 by such as rivets 64. The strips 56 and 58 define therebetween a guide channel 66 for receiving therein trunnions of the screen assembly 56 subsequently described herein. Suitably secured between the strips 56 and 57 by means of the rivets 64, are the longitudinally inward edges of fixed screen panels 68, whose outboard edges are suitably secured to the end members 44 and 46 of the screen frame 30.

As clearly seen in Figures 3 and 6, the inner strips 56 of the tracks 48 and 50 terminate at their free upper and lower ends in resilient hooked tongues 70 and 71, respectively, whose concavities 74 face in an inboard direction, as clearly seen in Figure 4, for retainably engaging trunnions described hereinafter. The outer strips 58 of the tracks 48 and 50 have at their lower ends curved notches 76 which face in an outboard direction and facilitate the folding of the screen assembly 56 as clearly shown in Figure 4.

The screen assembly 57 comprises upper and lower screen sections 78 and 80, respectively, comprised of rectangular frames 82 and 84 in which are secured screen panels 86 and 88. The lower member 90 of the upper section 78 is secured by a horizontal hinge 92 to the upper member 94 of the lower screen section 80. The hinge 92 enables the screen sections 78 and 80 to be folded downwardly in an outboard direction into substantial overlying relationship out through the window frame 14 by the driver of the vehicle. The hinge 92 is arranged at the outboard side of the screen sections to prevent hinging of the sections in an inboard direction beyond the coplanar relationship shown in Figure 3.

The lower screen section 80 has secured on its lower edge, as indicated at 95, and downwardly and inboardly angled flange 96, see Figures 3 and 4, terminating in a horizontal tubular portion 98 having extending therethrough a rod 100 whose ends extend laterally beyond opposite sides of the lower screen section and define trunnions 108 received in the guide channels 66 of the tracks 48 and 50. Secured on the upper edge of the upper screen section 78 is an upwardly and inboardly angled flange 102 terminating in a longitudinally extending tubular portion 104 having therein a rod 106 which extends at its opposite ends beyond the side edges of the screen section 78 and define trunnions 108, see Figure 5, which engage in the guide channels of the tracks 48 and 50.

A depending finger-engageable handle 112 may be secured to the upper portion of the upper screen section 78 at its inboard side for convenience in opening or folding the screen sections.

As seen in Figures 3 and 4, the screen sections 78 and 80 are disposed in closed coplanar positions wherein the trunnions 108 of the upper rod 106 are grippingly engaged by the resilient tongues 70 on the upper ends of the inner strips 56 of the tracks 48 and 50. When it is desired to lower or fold the screen assembly 54, the trunnions 108 of the lower screen section 80 move into and are retained by the notches 76 of the outer strips 58 of the tracks 48 and 50, as clearly seen in Figure 4.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed is:

1. In a screen for a vehicle window frame opening, a screen frame having top and bottom members and vertical end members, means for removably securing the screen frame in place on the window frame, a pair of longitudinally spaced vertical tracks secured at their upper and lower ends to said upper and lower members and having facing guide channels, a foldable screen assembly extending between said tracks and comprising an upper screen section and a lower screen section, said sections having upper and lower members, a horizontal hinge connecting the lower member of the upper section to the upper member of the lower screen section, upper horizontal trunnions on and projecting beyond the ends of the upper member of the upper section and rotatably and slidably engaging in said guide channels, lower horizontal trunnions on and projecting beyond the ends of the lower member of the lower section and rotatably and slidably engaged in the guide channels below the upper trunnions, said hinge being arranged to prevent hinging of said upper and lower screen sections relative to each other in one direction beyond vertical coplanar relationship while permitting said screen sections to be hinged relative to each other in another direction to overlying folded relationship, and resilient tongues on said tracks at the upper ends thereof having concavities into which the upper trunnions of the upper screen section are releasably engageable only in the unfolded coplanar relationship of the screen sections whereby the screen assembly is maintained in full closing relationship to the window frame opening.

2. In a screen for a vehicle window frame opening, a screen frame having top and bottom members and vertical end members, means for removably securing the screen frame in place on the window frame, a pair of longitudinally spaced vertical tracks secured at their upper and lower ends to said upper and lower members and having facing guide channels, said tracks having outer and inner strips, a foldable screen assembly extending between said tracks and comprising an upper screen section and a lower screen section, said sections having upper and lower members, a horizontal hinge connecting the lower member of the upper section to the upper member of the lower screen section, upper horizontal trunnions on and projecting beyond the ends of the upper member of the upper section and rotatably and slidably engaging in said guide channels, lower horizontal trunnions in and projecting beyond the ends of the lower member of the lower section and rotatably and slidably engaged in the guide channels below the upper trunnions, said hinge being arranged to prevent hinging of said upper and lower screen sections relative to each other in one direction beyond vertical coplanar relationship while permitting said screen sections to be hinged relative to each other in another direction to overlying folded relationship, and resilient tongues on said tracks at the upper ends thereof having concavities into which the upper trunnions of the upper screen section are releasably engageable only in the unfolded coplanar relationship of the screen sections whereby the screen assembly is maintained in full closing relationship to the window frame opening, the outer strips of said tracks having notches at the lower ends thereof and above the bottom member of the screen frame into which the lower trunnions on the lower screen section can move and be releasably retained as the screen sections are folded downwardly into overlying relationship.

3. In a screen for a vehicle window frame opening, a screen frame having top and bottom members and vertical end members, means for removably securing the screen frame in place on the window frame, a pair of longitudinally spaced vertical tracks secured at their upper and lower ends to said upper and lower members and having facing guide channels, said tracks having outer and inner strips, a foldable screen assembly extending between said tracks and comprising an upper screen section and a lower screen section, said sections having upper and lower members, a horizontal hinge connecting the lower member of the upper section to the upper member of the lower screen section, upper horizontal trunnions on and projecting beyond the ends of the upper member of the upper section and rotatably and slidably engaging in said guide channels, lower horizontal trunnions in and projecting beyond the ends of the lower member of the lower section and rotatably and slidably engaged in the guide channels below the upper trunnions, said hinge being arranged to prevent hinging of said upper and lower screen sections relative to each other in one direction beyond vertical coplanar relationship while permitting said screen sections to be hinged relative to each other in another direction to overlying folded relationship, and resilient tongues on said tracks at the upper ends thereof having concavities into which the upper trunnions of the upper screen section are releasably engageable only in the unfolded coplanar relationship of the screen sections whereby the screen assembly is maintained in full closing relationship to the window frame opening, the outer strips of said tracks having notches at the lower ends thereof and above the bottom member of the screen frame into which the lower trunnions on the lower screen section can move and be releasably retained as the screen sections are folded downwardly into overlying relationship, and resilient hook tongues on the inner strips of the tracks at the lower ends thereof having concavities into which the lower trunnions of the lower screen section engage as the screen sections are unfolded from overlying relation and are moved toward vertical coplanar relationship and the lower trunnions become disengaged from said notches.

References Cited in the file of this patent

UNITED STATES PATENTS

| | | |
|---|---|---|
| 1,813,474 | Ward | July 7, 1931 |
| 1,814,322 | McCormack | July 14, 1931 |
| 1,825,538 | Pace | Sept. 29, 1931 |
| 2,139,156 | Gill | Dec. 6, 1938 |
| 2,805,712 | McVicker | Sept. 10, 1957 |